United States Patent [19]

Wallace

[11] 4,227,464
[45] Oct. 14, 1980

[54] GANTRIES

[76] Inventor: Bernard E. Wallace, R.D. 1, Box 67A, Valley Hill Rd., Malvern, Pa. 19355

[21] Appl. No.: 944,733

[22] Filed: Sep. 22, 1978

[51] Int. Cl.³ .............................................. B66C 5/02
[52] U.S. Cl. .................................... 104/126; 52/645; 182/182; 212/218; 403/199
[58] Field of Search ........................ 212/13, 14, 126; 52/118, 632, 637, 638, 726, 645; 182/105, 182; 248/407, 159; 403/199, 262; 104/125, 126

[56] References Cited

U.S. PATENT DOCUMENTS

| | | | |
|---|---|---|---|
| 2,267,638 | 12/1941 | Clark | 52/637 |
| 2,995,094 | 8/1961 | Wallace | 212/13 |
| 3,131,899 | 5/1964 | Luhrs | 403/199 X |
| 3,934,676 | 1/1976 | Rice | 182/182 |

OTHER PUBLICATIONS

*Adjusta Gantry Crane* Price Sheet Campbell–Republic Corp.
*Thern Gantry Crane* Spec. Sheet.

*Primary Examiner*—Robert G. Sheridan
*Attorney, Agent, or Firm*—Charles H. Lindrooth

[57] ABSTRACT

Leg structure for portable, height-adjustable gantries is disclosed having an upper, single vertical tubular post member telescopingly received within an open-ended sleeve formed by coupled aligned channel members of lower, break-apart sectional supporting framework. The channel members are supported and elevated by diagonal bracing members and struts giving a generally inverted-Y shaped configuration to the leg so that it can straddle objects and permitting the free, unobstructed downward passage of the post through the lower opening of the sleeve. A locking bolt passes through aligned holes in the post and channels to selectively hold their relative positions, with hand-operated winch means aiding the movement of the post. Post extension members are disclosed which can be added to the leg post while the gantry is assembled. The plate connection between the top of the post and a load-supporting I-beam is externally and internally braced by triangles and post weldment or casting insert elements, respectively. Alternative embodiments show plate and tubular spacer channel coupling arrangements, and solid post-to-frame and non-breakdown frame leg configurations.

9 Claims, 25 Drawing Figures

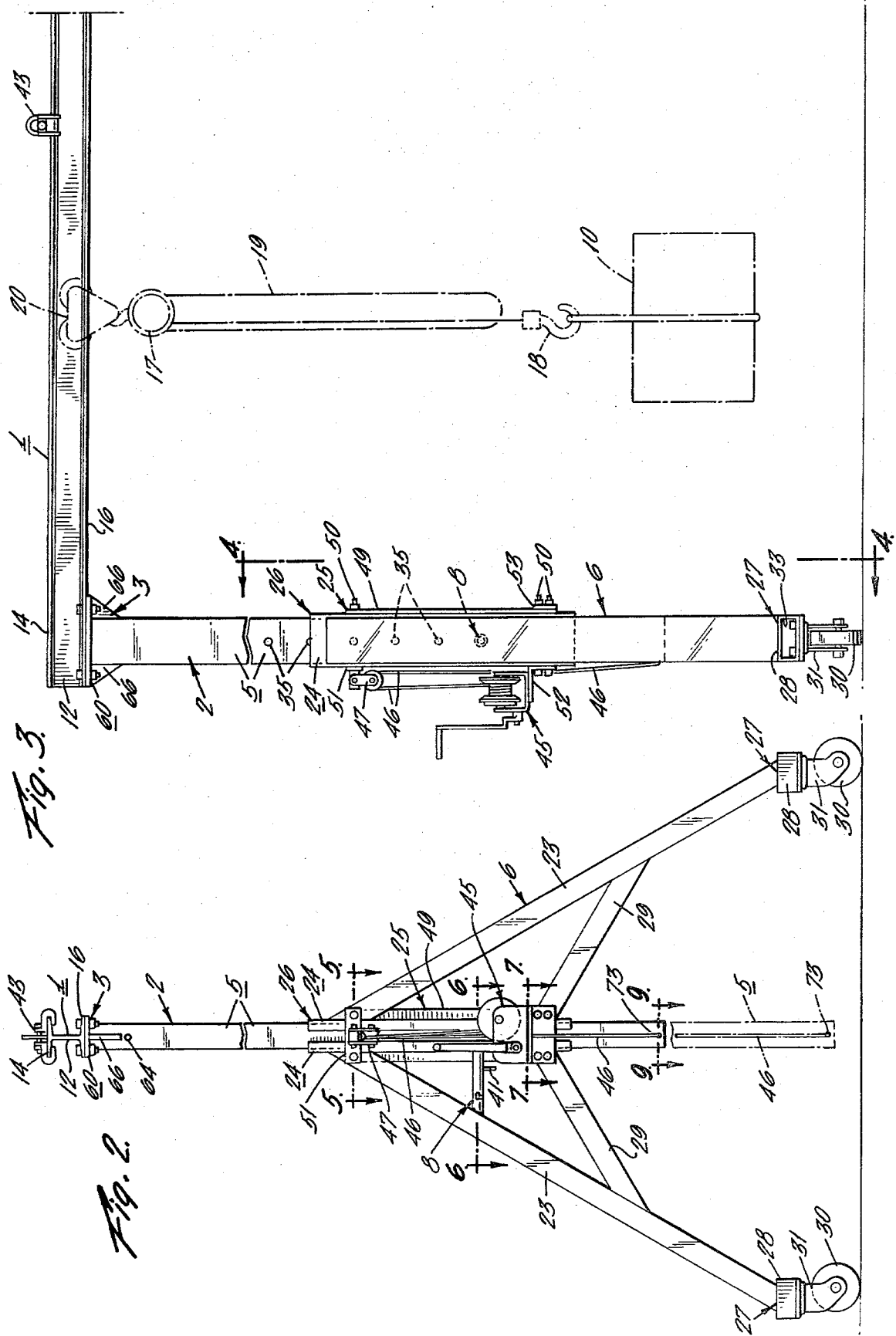

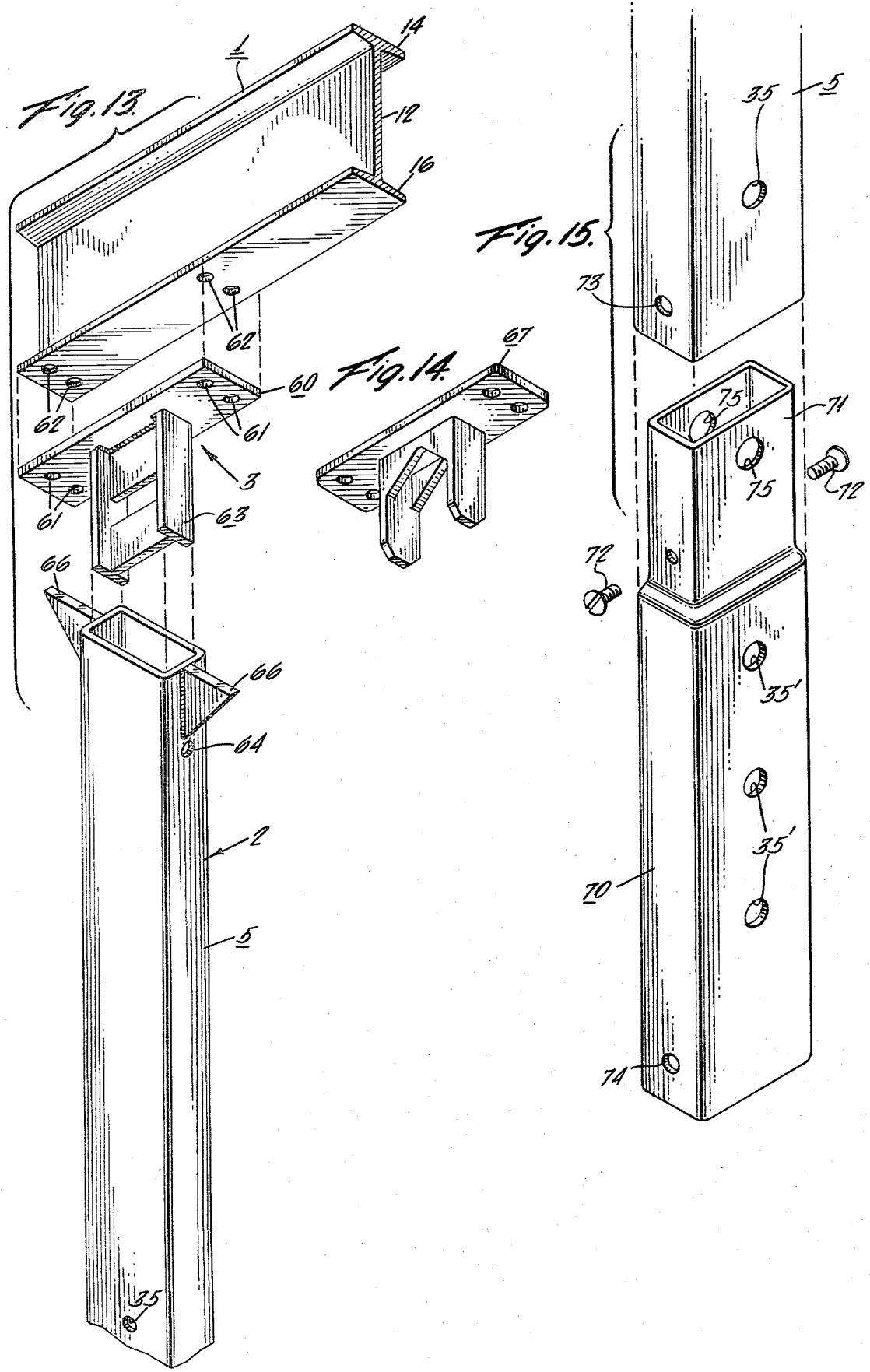

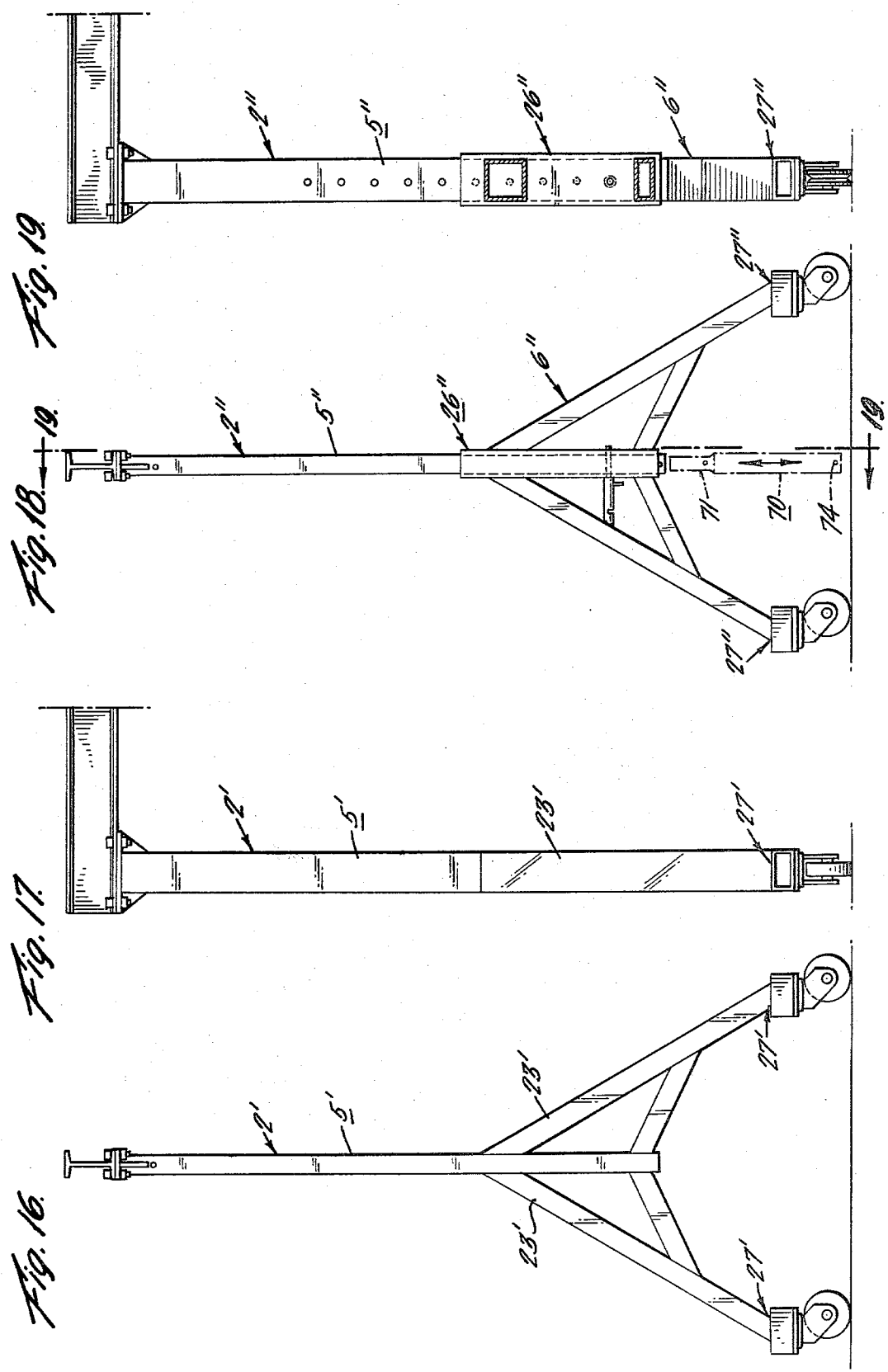

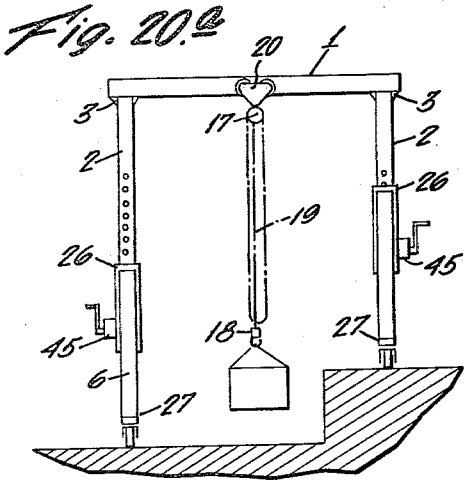
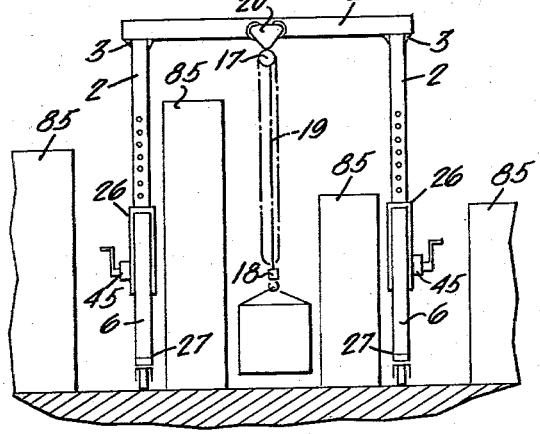
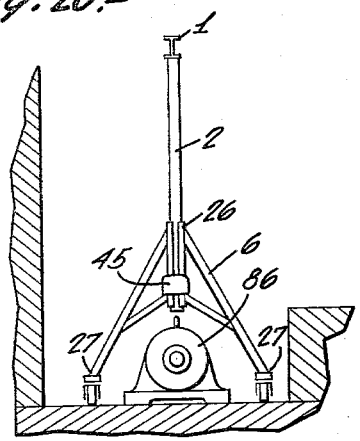
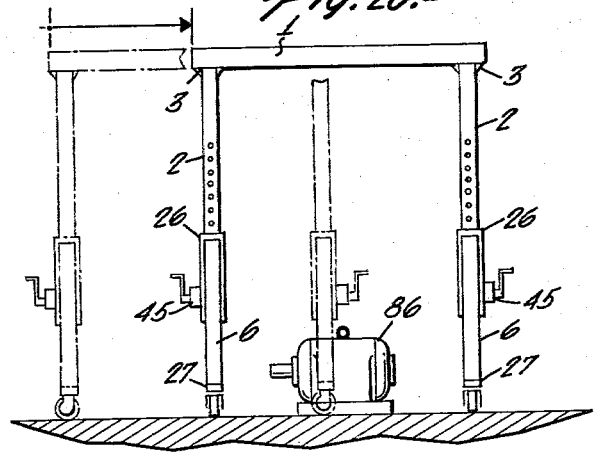
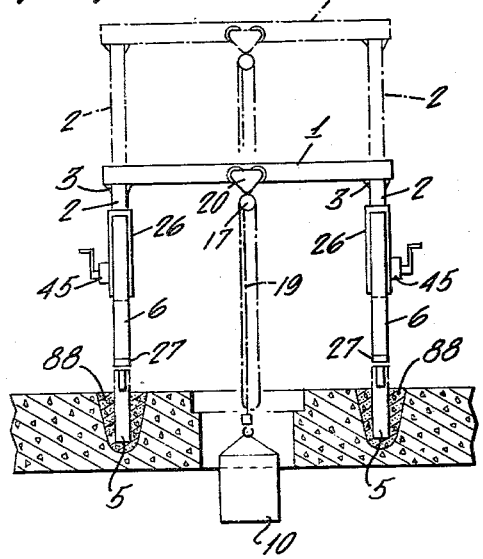
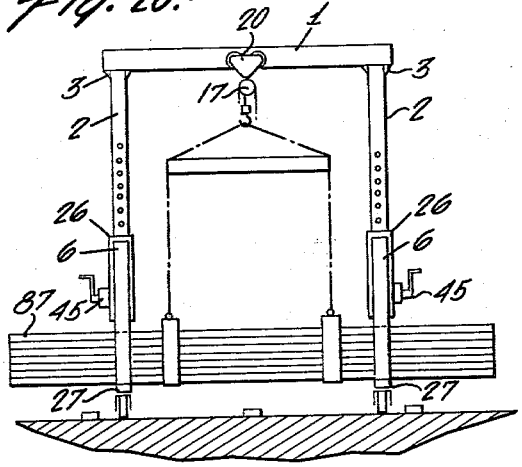

GANTRIES

FIELD OF THE INVENTION

This invention relates to gantries in general, and to movable load-handling gantry cranes in particular, especially gantries of the single-post leg type, either adjustable or nonadjustable in height. The invention involves improvements in leg support structure, including improved post-supporting framework and improved post-to-beam coupling, and new gantry combinations incorporating such improvements. Although the invention is disclosed herein in its application to operational systems of the full gantry type, the principles of the invention also apply to semigantry systems where one supporting element is on the ground and the other is on elevated trackage, and also to cantilevered variations.

DESCRIPTION OF THE PRIOR ART

"Single-post adjustable gantries" is a term applied to relatively simple, inexpensive gantries typically having a single, load-carrying bridging beam, such as an I-beam, supported at each end by an independently height-adjustable leg. In conventional designs, each leg usually has a single upper tubular post which fits within and telescopes into a lower tubular post of similar cross-sectional configuration but of a slightly larger cross-sectional area. Suitable means, such as matching apertures spaced along upper and lower posts across which a locking pin or bolt is inserted, selectively position the upper tube within the lower tube. Leg stability and footing is provided by supporting framework that braces and supports the lower post member.

Single-post adjustable gantries are popular because of their simplicity and price as compared with more expensive and complex adjustable gantries. This invention focuses in particular on several features of single-post gantries with the objective of providing an improved, more flexible and inexpensive gantry.

The typical supporting framework used to brace the lower post tube in known single-post designs is a triangular truss with the lower post tube serving as a vertical upright member in the middle. The upper chord of the truss is defined by two diagonal braces serving as the hypotenuses of two right triangles having a common vertical side represented by the lower tubular post. A horizontal cross member bisected by the base of the lower post defines the other two sides of the triangles. Foot brackets, such as casters positioned on swivel mountings, are disposed at each end of the horizontal cross member. The plane of the truss is oriented perpendicularly to the longitudinal axis of the beam.

There are several disadvantages inherent in this conventional configuration. For example, the range of height adjustment (maximum to minimum) for the leg is restricted because the base of the lower tubular post terminates at the top of the horizontal cross member and the sleeve provided by the lower post for receiving the upper post is closed at the bottom, thus preventing travel of the base of the upper post below the base of the lower post. Furthermore, the low elevation and location of the horizontal cross-member of the conventional design inhibits the capabilities of the gantry to travel in directions transverse to the plane of the truss and to lift loads wider than the span of the bridging beam because of the inability of the supporting framework of the leg to straddle objects in positions between its foot brackets.

One important object of the present invention is to provide improved leg structure for single-post gantries to offer greater permissible scope of leg height-adjustment and also to provide increased gantry travel and load-carrying capability. At the same time, greater strength and rigidity may be achieved.

A further important object of this invention is to provide improved post-to-beam coupling means which serves to increase leg resistance to bending.

SUMMARY OF THE INVENTION

This invention contemplates the provision of improved leg structure for support of a load-carrying member or beam in gantries. Ability for a leg to straddle objects is provided by leg structure comprising an upright upper post member mounted upon lower leg supporting framework made up of diagonals extending downwardly and outwardly on opposite sides of the post member, the leg structure being configured generally in the shape of an inverted-Y so that its structural elements avoid interference with straddled objects.

Expanded scope and flexibility of leg height-adjustability is provided by leg structure having an upright upper post member received within an open-ended sleeve provided within lower leg supporting framework and the provision of means mounting the upper post with respect to the supporting framework for selective positioning of said post within the sleeve along the axis of the sleeve, including positions wherein the lower end of the post extends below the bottom periphery of the sleeve-defining portions of the supporting framework.

Facilitated parts replacement and increased flexibility of gantry operation are provided by single-post beam end support structure having height-adjustment capability including break-apart sectional supporting framework comprising channel members coupled together to present an open-ended sleeve into which the upper leg post is received. A preferred embodiment of this invention supports said channel members on diagonal bracing members extending downwardly and outwardly to form the leg footing without the use of any horizontal cross-ties.

Increased buckling strength is provided by the external and internal bracing of the coupling between the upper leg post of a gantry and the supported bridging beam. In a preferred embodiment, resistance to bending from loads of any sort of a tubular leg post member is increased by the provision in a plate coupling of external bracing by means of the addition of structural elements connecting external portions of the post member with exposed portions of the plate, and also of internal bracing by means utilizing a rigid insert member within the top of the tubular post connecting internal portions of the post member to concealed portions of the plate.

BRIEF DESCRIPTION OF THE DRAWINGS

The above and other objects and advantages of the invention will become apparent by reference to the detailed description of a preferred embodiment and several modified embodiments thereof set out fully below by way of example of an application of the principles of the invention, and not by way of limitation thereof, and illustrated in the accompanying drawings in which:

FIG. 2 is an end elevational view looking toward the outside of the left leg structure of FIG. 1, with portions shown in dot and dash to illustrate the position of the post member when its lowermost end is close to the floor.

FIG. 3 is a fragmentary front elevational view showing the left portion of the device of FIG. 1, with wheeled trolley hoist supporting a load shown in phantom form.

FIG. 5 is a transverse sectional view of the device of FIG. 1 taken along the line 5—5 of FIG. 2.

FIG. 6 is a sectional view taken along the line 6—6 of FIG. 2.

FIG. 7 is a sectional view taken along the line 7—7 of FIG. 2.

FIG. 8 is a fragmentary sectional view taken along the line 8—8 of FIG. 6, with portions shown in dot and dash to illustrate the locking bolt mechanism in its retracted position.

FIG. 9 is a sectional view taken along the line 9—9 of FIG. 2.

FIG. 13 is a fragmentary exploded view of a preferred form of post-to-beam attachment means for the gantry shown in FIG. 1, but to a larger scale.

FIG. 14 is a perspective view of a modified form of the internal bracing structural insert element of FIG. 13.

FIG. 15 is a fragmentary exploded view of a modified form of the leg post member of the gantry shown in FIG. 1, but to a larger scale.

FIG. 16 is an end elevational view looking toward the outside of a modified form of the left leg structure of the gantry of FIG. 1, shown in a view corresponding to FIG. 2, but on a reduced scale.

FIG. 17 is a fragmentary front elevational view of the modified leg structure of FIG. 16, shown in a view corresponding to FIG. 3.

FIG. 18 is a view generally corresponding to FIG. 16, but of a further modified structure.

FIG. 19 is a view generally corresponding to FIG. 17, but of the leg structure of FIG. 18 taken along the line 19—19.

FIGS. 20a through 20f show, by schematic representation of a preferred form of gantry using single-post supports, some of the various uses and advantages of the principles of the invention.

DESCRIPTION OF PREFERRED EMBODIMENT

Figure 1:
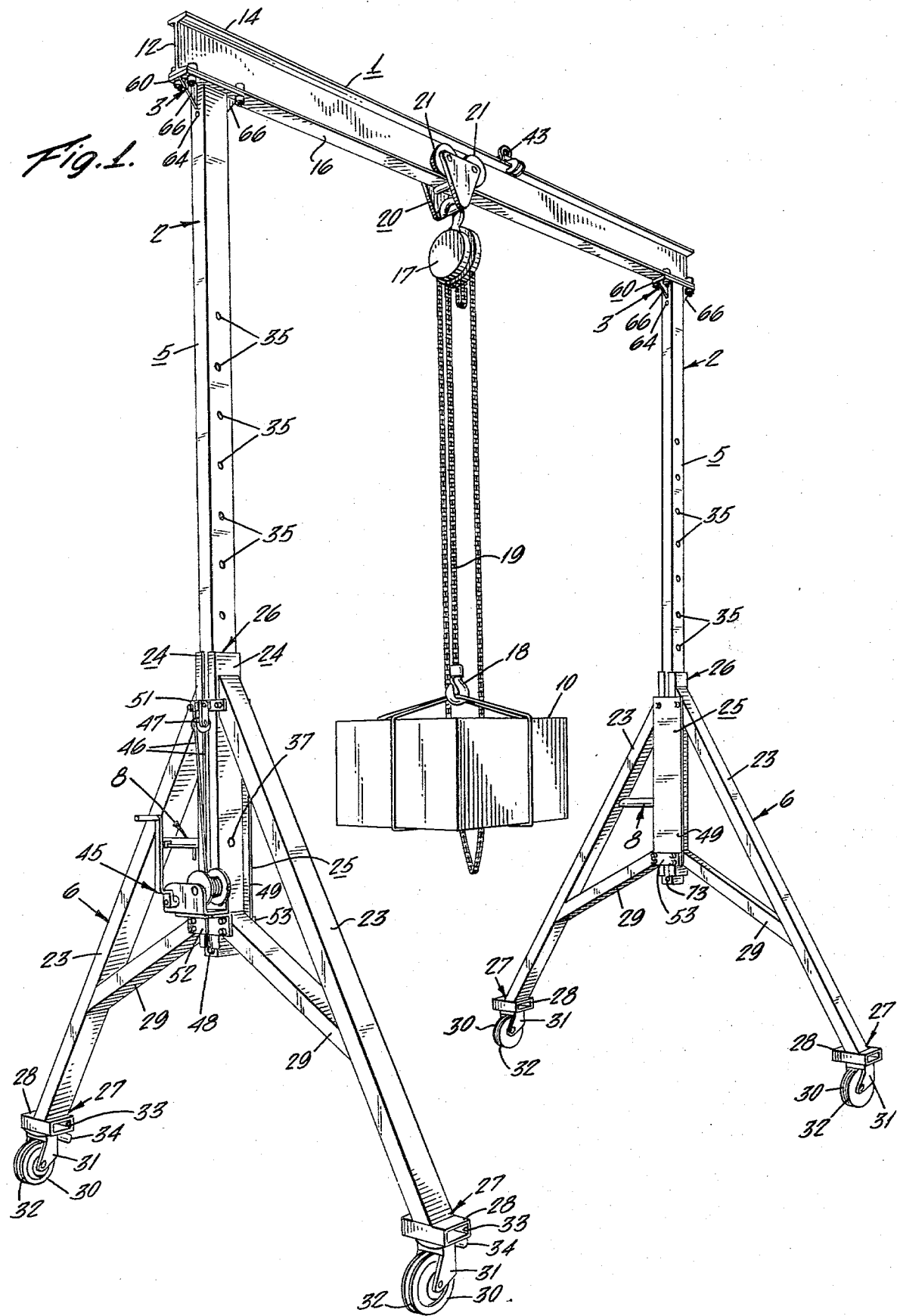
FIG. 1 is a perspective view of a preferred embodiment of the invention shown in its application to a height-adjustable gantry crane supporting a load from its beam and utilizing a single-post leg structure at each end.

The general features of the invention are described with reference to their application in a preferred embodiment of a single-post leg type of height-adjustable gantry crane, such as shown in FIG. 1. The illustrative embodiment comprises an elevated load-carrying member or beam 1 carried in bridging fashion by legs or end supports 2 spaced apart lengthwise of the beam and suitably fastened thereto by the use of leg mounting means 3. Each leg 2 is comprised of a single upright post member 5 supported by lower framework assembly 6 which serves to stabilize post 5 and function as footing structure for the leg 2. In the preferred arrangement, post 5 and lower supporting framework 6 cooperate in telescoping fashion to impart height-adjustment capability to leg 2. Suitable post mounting and positioning means 8 serve to establish the selective positioning of post member 5 relative to lower framework assembly 6.

The load-carrying bridging beam 1 is a standard commercially available beam of I, H, L, channel or other like cross-section from which it is possible to suspend a load 10. The preferred beam configuration (as seen in FIG. 1) is a standard steel I-beam, elevated in use above leg 2 so that web 12 is generally oriented vertically and upper and lower flanges 14 and 16, respectively, are generally oriented horizontally.

A load 10 may be suspended from beam 1 in any of several known ways. The load 10 may, for example, be slung from a hoist 17, as by means of swivel hook 18 carried by cable or chain 19. Such hoist 17 can be mounted on a wheeled trolley 20 whose wheels 21 ride on the upper surface of lower flange 16 of the I-beam. The top ends of legs 2, preferably mounted on the underside of beam 1 adjacent to the ends thereof, serve as stop means for the travel of trolley 20 along the flange 16. However, if cantilevered beam arrangement is desired, appropriate provision of an end stop (not shown) for the trolley 20 can be made.

The leg structure 2 at each end of the beam 1 of the preferred embodiment may be identical for left and right legs of FIG. 1, and a description of one leg may be taken as typical of both. Each leg comprises two telescopic portions. These are upper and lower portions when the gantry is in use. The upper portion is a single, hollow tubular post 5 (FIGS. 1 to 3), preferably made of steel or aluminum alloy. The lower portion is a sectional framework 6 (FIGS. 1 to 4) of bracing members 23 supporting cooperating channel members 24 in opposing alignment by channel coupling means 25, with the channels thereby defining an open-ended sleeve 26 into which the post 5 can be received. In its preferred form, each section of the framework 6 is comprised of steel elements suitably bonded together, such as by welding, and comprises a vertical channel member 24 out of the upper outside surface of which extends outwardly and downwardly at a preferred angle of approximately 30 degrees, a diagonal member 23 which terminates in a foot end 27 on which is located a foot bracket 28. A short diagonal strut 29 extends from the lower outside surface of the channel member 24 outwardly and downwardly to a point on the inside surface of diagonal member 23 above the foot end 27. Other suitable configurations for the sections of framework 6 can be constructed, and while identity of configuration of coupled sections is preferred for reasons of symmetry of load distribution and cost savings in parts replacement, such identity is not essential. It is desirable, however, that the assembled framework 6 regardless of structural configuration have the characteristic of an open-ended tubular sleeve 26 into which the post 5 can be received permitting the base of post 5 to protrude out from the lower opening of the sleeve 26 when a low leg height-adjustment is selected (best seen in FIGS. 2 and 4). A further desirable characteristic for framework 6 is the provision of sufficient unobstructed space between foot ends 27 to permit frame 6 to straddle objects (FIGS. 4, 20c and 20d).

The foot bracket 28 can be constructed in any of various suitable configurations. One such configuration, best seen in FIGS. 1 to 4 and 10, includes mounted on the bracket 28 a steel roller bearing wheel 30 on a swivel caster 31, shown with the further available option of added four-position swivel lock 34 (FIG. 10) and/or brakes, or the like. The wheel can include a deep V-notch groove 32 (FIGS. 1 and 10) around its circumference to enable the gantry to ride on rail guides (not shown). The mounting bracket has an opening 33 (FIGS. 1, 3 and 10) to permit access to the swivel mounting means for easy removal of the swivel assembly so that a choice of mobile or firm footing is offered.

Figure 6:
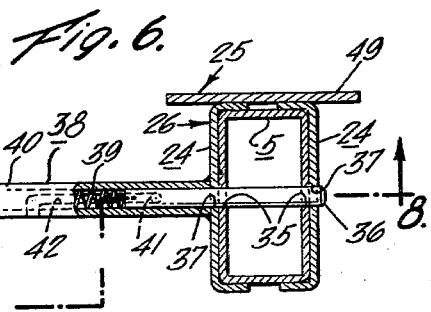
Figure 8:
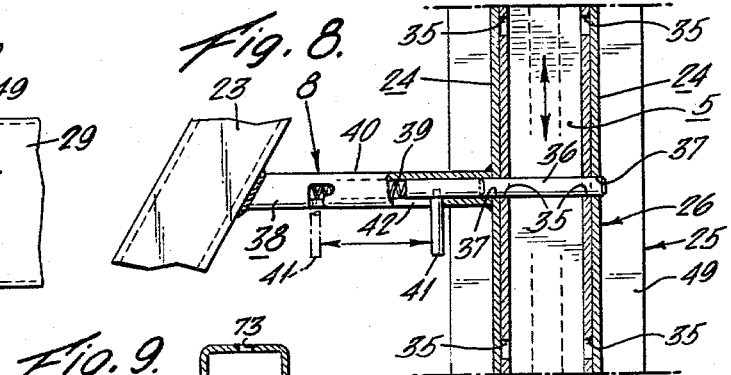
Figure 9:
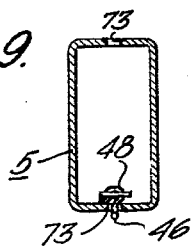
Figure 10:
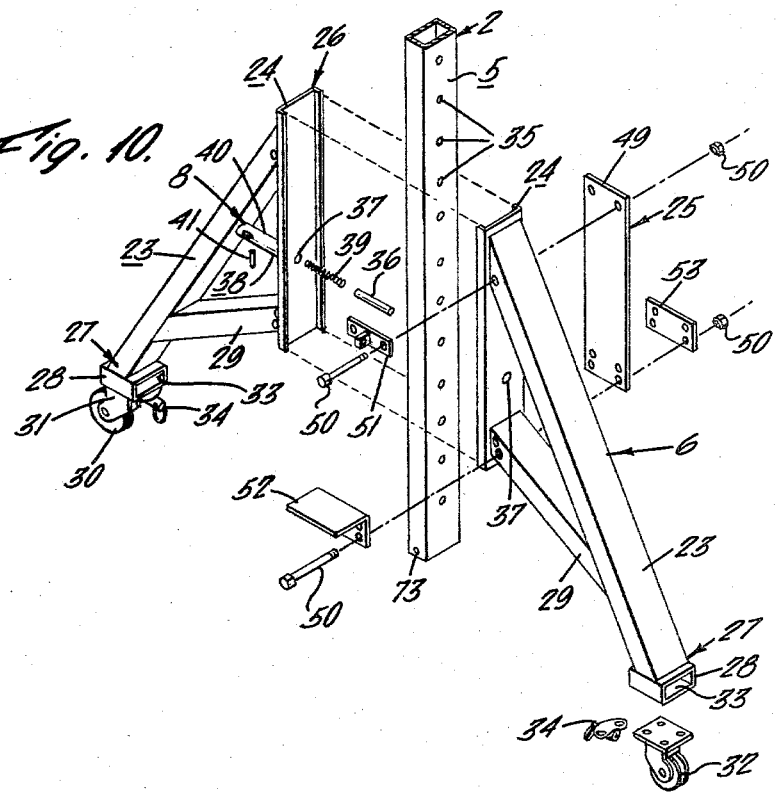
FIG. 10 is an exploded view, with parts shown in perspective, of a preferred embodiment of coupling for the sections of the end support of FIG. 4.

Height-adjustment of the leg 2 is achieved by suitable means 8 for mounting and positioning the post 5 within the channel sleeve 26. In the preferred structure (seen especially in FIGS. 6, 8 and 10), a rectangular cross-sectioned tubular post member 5 is apertured with a plurality of holes 35 spaced lengthwise along opposite sides of the post 5 to receive cross-bolt 36 which extends through corresponding matched holes 37 in each of the sleeve-defining channels 24. Bolt locking mechanism 38 includes compression spring 39 (FIGS. 6, 8 and 10) located behind bolt 36 in bolt housing 40 normally biasing the bolt 36 in a position protruding from housing 40 through aligned apertures 35 and 37 (shown best by solid lines in FIG. 8). Handle pin 41 extends perpendicularly from bolt 36 through guideway 42 of bolt housing 40 (FIGS. 8 and 10). The release of post 5 for vertical movement within sleeve 26 is effectuated by driving bolt 36 against spring 39 by manual manipulation of pin 41 along guideway 42 into locked position with bolt 36 contained within housing 40, as shown by dot and dash positions in FIG. 8. Bolt housing 40 is preferably welded to form an integral part of frame 6, for example, to diagonal 23 as shown. Once the bolt is slid back into housing 40 and away from post member 5, the post member can be moved up or down within sleeve 26 as indicated by the arrow in FIG. 8, so as to raise or lower the height of the legs. This post adjustment can be accomplished using a forklift truck or the like to support beam 1 from below, or by using suitable crane or winch means to support beam 1 from above, such as by lifting of slinging ring or hook 43 (FIGS. 1 to 3) which is slidably mounted on upper flange 14 of the beam 1. Preferably, leg 2 is provided with post adjusting winch assembly 45 (FIGS. 1 to 3) having cable 46 wound around pulley assembly 47 and secured to cable anchor 48 (see also FIG. 9) at the base 73 of post member 5.

Figure 4:
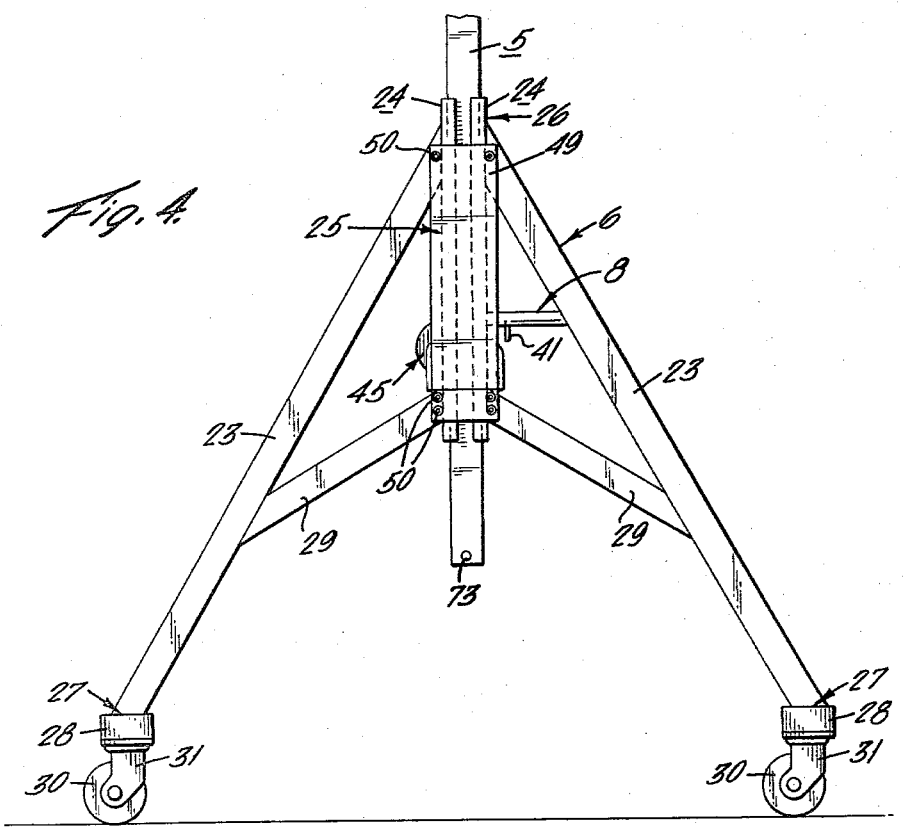
FIG. 4 is a fragmentary sectional view taken along the line 4—4 of FIG. 3.
Figure 5:
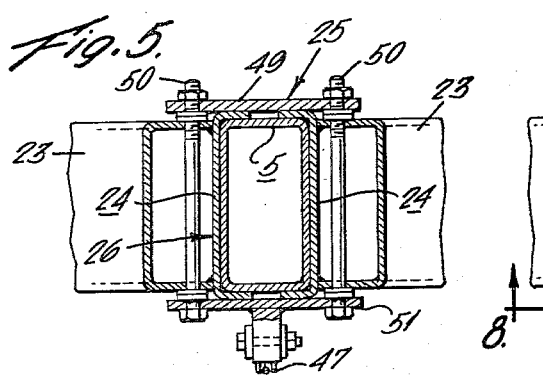
FIGS. 5 to 9 are sectional views to a larger scale than FIGS. 1 to 4, and in this group.
Figure 7:
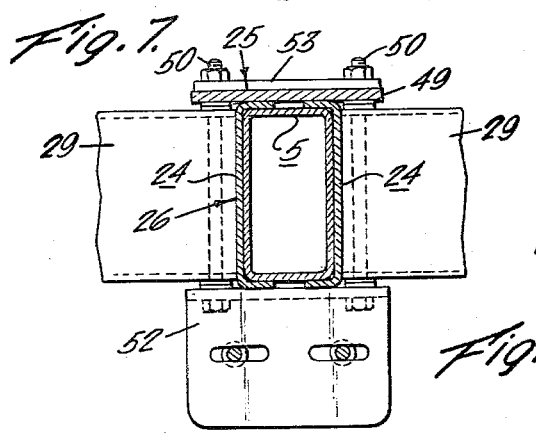

The preferred coupling means 25 for uniting the channels 24 of frame 6 to form open-ended sleeve 26 and prevent relative lateral and longitudinal movement of cooperating channels 24 is shown in FIG. 4 and in exploded fashion in FIG. 10. Plate 49 attaches to the aligned sections of lower leg support framework 6 by removable mounting means such as threaded bolt and nut sets 50 or the like, so as to cover the opening between the sides of aligned channels 24. Plate 49 is shown joined to the same sides of diagonals 23 and 29 at points closely adjacent the sides of channels 24. Partial plate structure 51 (FIG. 10) joined to the outside of frame 6 adjacent the top of channels 24 forms a part of pulley assembly 47 of post adjusting winch system 45 and it, together with winch assembly plate piece 52 and optional plate piece 53, is likewise removably mounted and serves to fix the relative positions of the aligned channels 24. Where the winch option 45 is not included, partial plate structure 51 is retained and a second plate piece 53 may be used in place of plate piece 52. This latter arrangement serves to prevent radial movement of framework 6 about post member 5. FIGS. 5 and 7 show transverse sectional views of the preferred coupling means 25 taken along lines 5—5 and 7—7 of FIG. 2, respectively.

Figure 11:
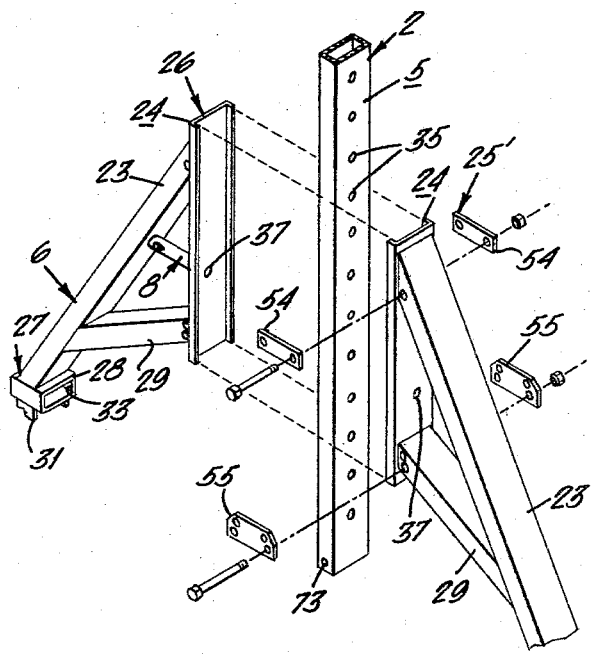
FIG. 11 is an exploded view of a modified form of the coupling of FIG. 10.
Figure 12:
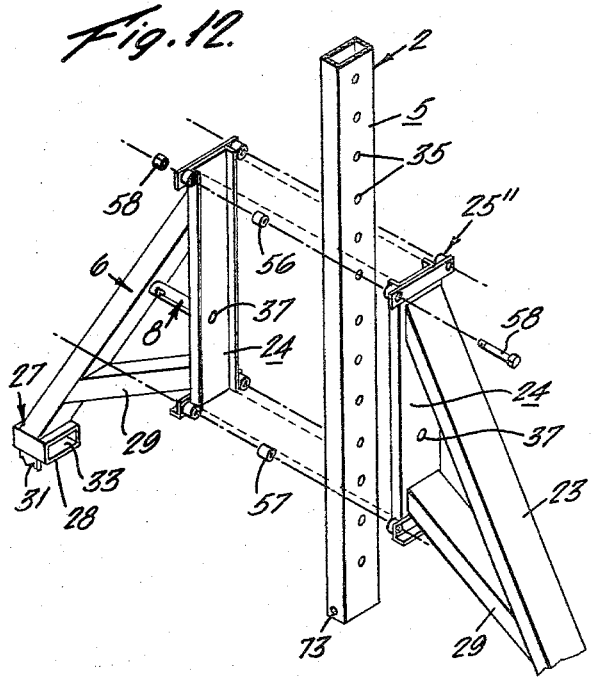
FIG. 12 is an exploded view of a further modified form of the coupling of FIG. 10.

FIGS. 11 and 12 show in exploded form two modifications of the coupling means 25 of FIG. 10 which also serve to maintain the relative aligned positions of channels 24 and prevent locking of the post 5 as it travels in sleeve 26 (see FIG. 4). FIG. 11 illustrates a coupling arrangement 25' using partial plates 54 and 55 to join upper and lower parts of inside and outside leg sides of sections of frame 6 adjacent channels 24 in lieu of the full plate 49 configuration shown in FIG. 10. FIG. 12 illustrates a coupling arrangement 25" using tubular spacers 56 and 57 and fasteners 58 to accomplish the same function.

FIG. 13 illustrates the preferred means 3 for mounting leg 2 to beam 1. The upper portion of tubular post member 5 is bonded, as by welding, to attachment plate 60 and plate 60 is mounted on beam 1 so that it is flush with the underside of lower flange 16.

Use of removable mounting means such as bolt fasteners (not shown) passed through aligned apertures 61 and 62 in plate 60 and flange 16, respectively, offers the advantage of easy leg removal for repair and replacement. Also, the leg may easily be repositioned elsewhere on the beam for varying applications, as where the beam 1 is cut to shorten desired gantry span. Rigid insert member 63 welded to plate 60 fits within the confines of the upper part of tubular post 5 and connects internal portions of post 5 with concealed central portions of plate 60 to provide internal bracing for post 5. The insert member 63 is shown as an I-beam section with web portions removed to minimize weight and which is welded to the center of plate 60. During leg assembly, once attached to plate 60, insert 63 is placed into the top of post 5 and the flanges of insert 63 are welded to the sides of post 5 by plug welding through holes 64 pre-drilled into the sides of post 5. External bracing of post 5 is accomplished by external bracing elements, such as triangles 66, connecting external portions of post 5 to exposed portions of plate 60. This connection is accomplished by welding triangles 66 to portions of post 5 and plate 60 after insert 63 has been welded to post 5. FIG. 14 shows a modification of the plate 60 and insert 63 assembly of the internal post bracing structure of FIG. 13, and comprises a casting 67 to replace the weldment of FIG. 13.

The internal and external bracing of post 5 imparts increased leg resistance to bending by stiffening the upper portion of post 5 near the point of junction with load-carrying member 1. This serves to provide protection, for example, against incidents of accidental running of the leg 2 into an obstacle during operation.

FIG. 15 shows post extension piece 70 having the same dimensions and cross-sectional configuration as post 5, except for a reduced-end portion 71 which is inserted into the base of post 5 and suitably locked therein by locking means 72. The open-sleeve configuration of frame 6 permits extension 70 to be added or removed at the bottom of post 5 without disturbance of the leg-to-bridge attachment 3, already described, (FIG. 1), and without the need to disassemble the leg. Suitable apertures 75 are provided in the reduced-end portion 71 to allign with holes 35 when the extension is in place on the post. For arrangements having a post-adjusting winch 45, the cable anchor 48 is removed from the base of post member 5 at 73 and reattached to the base of post extension piece 70 at 74 in adding extension 70 below post 5. The process is reversed in removing extension 70. Multiple extension pieces 70 may be added to the bottom of post member 5 taking advantage of the unobstructed lower opening of sleeve 26 (FIGS. 1, 2 and 4). FIG. 18 shows the post extension piece 70 aligned for attachment to the base of post member 5" of a modified form of the leg structure of FIG. 1.

FIGS. 16 and 17 illustrate a modified leg 2' utilizing some of the principles of this invention. The leg 2' is a single, unitary structure having a generally inverted-Y configuration and including a raised vertical post member portion 5' and diagonal supporting bracing member or strut portions 23' diverging outwardly and downwardly on opposite sides of the post member portion 5' from points adjacent the lower part of the post portion 5' and terminating in foot ends 27' with the bottom-most part of post portion 5' sufficiently elevated to permit the leg 2' to straddle objects located between its foot ends 27'.

FIGS. 18 and 19 illustrate a further modified leg 2" utilizing some of the principles of the invention. The leg is similar to the preferred embodiment of let 2 already described in detail having vertical post member 5" telescopingly received into an open-ended sleeve 26" disposed at the vertex of generally inverted-V shaped supporting framework 6" having foot ends 27". The embodiment of leg 2", however, utilizes a one-piece supporting frame 6" rather than the sectional supporting frame assembly 6 of FIG. 1, and leg 2" includes a unitary vertical hollow tubular element 26" in lieu of the coupled channel piece sleeve 26 of FIG. 1.

Some of the operational uses and advantages of the preferred embodiments of the single-post gantry described above are seen in the schematic representations shown in FIGS. 20a through 20f.

The leg height-adjustment process, as already stated, involves alignment of the desired pair of elevational holes 35 on post 5 with corresponding holes 37 in the sleeve structure 26 of lower leg frame 6 and passing of bolt 36 therethrough to hold relative positioning of the telescoping leg portions (see FIGS. 8 and 10). When the bolt 36 is withdrawn from the aligned holes 35 and 37, the post can be moved up and down in sleeve 26 along the sleeve axis. Because the sleeve 26 is open at its top and bottom and the downward passage of post 5 through the lower opening of sleeve 26 is unhindered by structural members of lower leg portion 6, greater range (maximum to minimum) of post height adjustment is available with this gantry than with conventional designs for the reason that post 5 can descend further with respect to lower leg portion 6 of this construction than is possible with the generally known constructions.

Excess length can be removed from the leg post 5 while the gantry is assembled and in use by cutting off an appropriate portion from the base that is made to protrude out of the bottom of the sleeve 26. The base of post 5 can even be lowered below floor level into a suitable recess. This latter feature is especially useful if it is desired to transport an assembled gantry beneath a low overhanging obstacle. Furthermore, in this gantry design, post extensions 70 (described above in reference to FIGS. 15 and 18) can be added and removed from post 5 on the erected structure.

FIG. 20a illustrates a split level adjustment of the gantry, with each independently height-adjustable leg 2 set at a different height (i.e., locking bolts placed through different pairs of post holes 35) to achieve horizontal leveling of beam 1.

FIG. 20b shows the ability of the gantry to straddle objects located between its legs 2. In the preferred embodiment, the structure of legs 2 lies essentially in a plane which is perpendicular to the longitudinal axis of beam 1. Thus, the gantry may be moved over objects such as storage racks 85 and the like with very little traveling space between them. FIGS. 20c and 20d show the ability of the preferred gantry to travel over objects, such as motor 86, permitting them to pass between foot ends 27 of legs 2, thereby facilitating movement into narrow spaces and thus important flexibility to the use of the structure. FIG. 20d shows movement of legs 2 across motor 86 in the direction of the arrow, along a path parallel to the axis of beam 1 from the dot and dash position to the solid line position. FIG. 20e shows the use of the leg 2 object-straddling ability to carry a load such as a tubing or bars 87 which is wider than the span of beam 1.

FIG. 20f shows a particular instance of use of the gantry break-away sectional construction and open-ended sleeve features of the lower leg portion 6 of the invention. In this particular application it is desired to erect a gantry in a more or less permanent position over a certain open floor area for the purpose of raising and lowering loads 10 in elevator fashion from storage area located beneath the opening. The gantry shown in raised dot and dash position is positioned with post members 5 over suitably prepared recesses 88. The legs 2 are lowered so that post members 5 descend into the recesses 88 with the gantry feet 27 resting on the floor and the leg straddling the recesses. Concrete or other appropriate hardening agent is poured into recesses 88 and permitted to harden, after which the lower leg frame structure 6 of each leg 2 is broken away by disengaging channel coupling means 25 (not shown in FIG. 20f) and the beam 1 remains supported by the two single posts 5 to serve the elevator function.

The foregoing detailed description of the construction and uses of the preferred embodiment and modifications of the invention in its application to a height-adjustable gantry serves to show by way of specific example the use of some of the many features of the invention. This detailed description is not intended in any way to limit the broader aspects and scope of the invention or its use in connection with any other embodiments incorporating these and other features thereof; and it is to be understood that the applicant intends the specification and claims to be construed as broadly as possible in light of the state of the prior art.

I claim:

1. In a portable gantry having a load carrying beam from which a hoisting mechanism is adapted to be suspended, said gantry being adapted to straddle elongated objects; supporting leg structure for said gantry comprising an upright hollow post member of rectangular cross section, the longer axis of the rectangle extending in the direction of the long axis of the beam, fastening means interconnecting the post to the beam comprising a rigid insert member secured to the post at the upper end thereof and projecting into the end of the post, said insert member having fastening means for connection to the beam, said insert member being dimensioned to brace the interior of the post against bending with respect to the beam, a support means for the post comprising a pair of inclined bracing members extending downwardly and outwardly from the post at points on the post equally displaced upwardly from the bottom of the post, said bracing members lying in a plane which is at right angles with respect to the longitudinal axis of the beam, and having ground engaging roller means at the bottom thereof, and a pair of inclined reinforcing struts connected to each bracing member, each reinforcing strut extending downwardly and outwardly from the post from points adjacent the bottom of the post to points intermediate the ends of the bracing members, said inclined bracing members and struts providing ground clearance for elongated objects in vertical planes beneath said beam.

2. A portable gantry according to claim 1, further including an elongated vertical sleeve dimensioned to receive the lower end of said post, means securing the bracing members and the struts to the sleeve, and means providing for lengthwise adjustment of the post within the sleeve.

3. A portable gantry according to claim 2 wherein said sleeve comprises a pair of channel members mounted in face-to-face relationship with the flanges of the channels fitting around the post, said securing means fastening one end of each of said bracing members and said struts to a channel member and coupling means including removeable fastener members for interconnecting said pair of channel members.

4. A portable gantry according to claim 3, said securing means further comprising at least one elongated flat plate and said fasteners are positioned to interconnect said plate to the facing webs of said channels at plural spaced locations on each web.

5. A portable gantry according to claim 3 further including means for positioning the post within the sleeve comprising a plurality of apertures spaced lengthwise of the post and said channels in aligned relationship, a locking bolt adapted to be passed through aligned ones of said apertures and a spring biasing means for urging said locking bolt through said apertures into locking position.

6. A portable gantry according to claim 5 wherein said ground engaging roller means comprises casters secured to the bottom of each of said inclined bracing members and swivel mounting means for the casters for permitting swivelling of the casters to permit movement of the gantry in directions extending alternatively lengthwise or transversely of the long axis of the beam.

7. A portable gantry according to claim 1, further including reinforcing gusset plates secured to the tops of the post, each said gusset plate lying in a plane extending lengthwise of the beam.

8. A portable gantry according to claim 7 further including an extension piece for the post, said extension piece comprising a stepped rectangular tubing piece having an end portion of reduced cross section at one end adapted to fit within the lower end of the post, the balance of the piece having the same cross section as the post whereby the extension piece fits within the sleeve when the post is in the raised position, and means for fastening said extension member to said post.

9. A portable gantry according to claim 1 wherein said ground engaging roller means comprises casters secured to the bottom of each of said inclined bracing members and swivel mounting means for the casters for permitting swivelling of the casters to permit movement of the gantry in directions extending alternatively lengthwise or transversely of the long axis of the beam.

* * * * *